US 9,595,279 B1

(12) United States Patent
Martin

(10) Patent No.: US 9,595,279 B1
(45) Date of Patent: Mar. 14, 2017

(54) ACCELERATING THERMAL DECAY OF A HARMONIC-RATIO REFERENCE TRACK

(71) Applicant: Seagate Technology LLC, Cupertino, CA (US)

(72) Inventor: Richard Edward Martin, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/925,105

(22) Filed: Oct. 28, 2015

(51) Int. Cl.
*G11B 21/02* (2006.01)
*G11B 5/60* (2006.01)

(52) U.S. Cl.
CPC .................................. *G11B 5/6029* (2013.01)

(58) Field of Classification Search
None
See application file for complete search history.

(56) References Cited

U.S. PATENT DOCUMENTS

| 6,359,744 | B1 | 3/2002 | Mallary |
| 6,611,389 | B1 | 8/2003 | Liu et al. |
| 8,730,610 | B2 * | 5/2014 | McFadyen ........... G11B 5/3133 360/75 |
| 8,773,802 | B1 * | 7/2014 | Anderson ............ G11B 5/6029 360/55 |
| 9,076,474 | B1 | 7/2015 | Tang et al. |

\* cited by examiner

*Primary Examiner* — K. Wong
(74) *Attorney, Agent, or Firm* — Hollingsworth Davis, LLC

(57) ABSTRACT

A reference track written to a magnetic recording medium includes at least two harmonics that facilitate measuring a clearance between a read/write head and the recording medium. A magnetic field is applied to the reference track that accelerates a thermal decay of the reference track without erasing data of the reference track.

20 Claims, 5 Drawing Sheets

| 65C Total Decay Induced Clr Error (Ang) | | | |
|---|---|---|---|
| Track Pre Condition | 24 hours | 5 years | Post 1st day |
| Aged with DC erase | 2.06 | 3.13 | 1.07 |
| No ageing | 5.82 | 8.84 | 3.02 |

ACCELERATING THERMAL DECAY OF A HARMONIC-RATIO REFERENCE TRACK

SUMMARY

The present disclosure is directed to a method, system, and apparatus used to accelerating thermal decay of a harmonic-ratio test track. In one embodiment, a reference track written to a magnetic recording medium includes at least two harmonics that facilitate measuring a clearance between a read/write head and the recording medium. A magnetic field is applied to the reference track that accelerates a thermal decay of the reference track without erasing data of the reference track.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic data storage devices such as hard disk drives. A hard disk drive utilizes a magnetic read/write head to record data to and read data from a magnetic disk. The read/write head (also referred to as a slider) is held close to the disk without touching the disk. A bottom surface of the read/write head is configured as an air bearing surface (ABS) that causes the read/write head to be separated from the disk by a thin layer of air. The read/write head may include other features (described below) that facilitate finely controlling the spacing between transducers of the read/write head to account for surface irregularities or other imperfections that could result in non-optimal spacing and/or head-to-disk contact.

As the areal density of modern perpendicular media has increased, the head-to-media clearances have decreased. This is due at least in part to the reduced magnetic flux produced by the smaller bit regions. Decreasing the head-to-media clearance increases the sensitivity of the read transducer, enabling it to better read the smaller bits. However, maintaining these decreased clearances requires measurement of clearance with increasing levels of accuracy and reliability. In the present disclosure, apparatuses and methods are described that increase the reliability and accuracy of clearances determined based on harmonic ratio (HR) measurements. In particular, methods and apparatuses are described that can accelerate thermal-decay of an HR reference track, thereby reducing clearance measurement errors due to long-term thermal decay.

Figure 1:
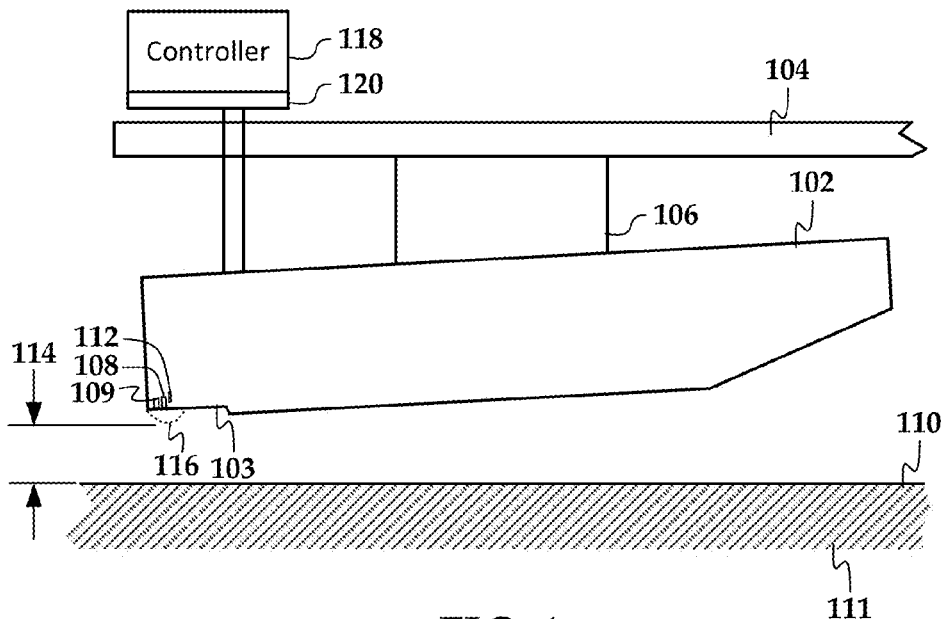
FIG. 1 is a block diagram of a read/write head and recording medium according to an example embodiment.

In FIG. 1, a diagram illustrates a read/write head 102 and magnetic recording medium 111 (e.g., magnetic disk) used in procedures described below. The read/write head 102 may also be referred to herein as a slider, read head, recording head, write head, etc. The read/write head 102 is coupled to an arm 104 by way of a suspension 106. The read/write head 102 includes at least one read transducer 108 and at least one write transducer 109 at a media-facing surface 103, e.g., ABS.

The transducers 108, 109 are held proximate to a surface 110 of the magnetic recording medium 111 while reading and writing data. The media-facing surface 103 includes air-bearing features that cause the read/write head 102 to be separated from the recording surface 110 via a thin layer of air. A heater 112 is activated to adjust a clearance 114 between the transducers 108, 109 and the recording surface 110. The heater 112 causes a local protrusion 116 due to thermal expansion of material surrounding the transducers 108, 109. By controlling a current supplied to the heater 112, the clearance 114 can be actively adjusted. The clearance 114 may also be referred to, among other things, as head-to-media clearance, adaptive fly height (AFH), and/or head-to-media spacing (HMS).

A controller 118 includes logic circuits that control current supplied to the heater 112, as well controlling the as sending and receiving of signals to and from the recording head. Those signals include read and write channel data, sensor data, etc. An interface 120 conditions the signals between the controller 118 and the read/write head, performing pre-amplification, filtering, analog-to-digital conversion, digital-to-analog conversion, encoding, decoding, etc.

As noted above, the clearance 114 can be measured using HR algorithms. This may involve recording test data to the recording medium 111. The test data may be factory pre-written and/or written via the read/write head 102. The test data includes signal patterns with at least two harmonic frequencies. The read transducer 108 reads the test tracks, and the signals are analyzed via controller 118 to estimate the clearance 114. This may be performed during factory testing of the hard drive, and may also be performed during operation of the hard drive.

Harmonic ratio measurement algorithms utilize the Wallace spacing loss equation to estimate head-to-media spacing. The Wallace equation dictates that the log of the ratio of two amplitude measurements is linear in spacing. Thus, the ratio of amplitude measurements at two different frequencies can be used to accurately measure HMS. Any gain change that is frequency independent will divide out, improving the robustness of the measurement system.

In perpendicular media, low-frequency transitions are less thermally stable than high-frequency transitions. In a harmonic ratio (HR) based clearance measurement, this decay makes the high-frequency amplitude appear to grow relative to the low-frequency amplitude, which is misinterpreted as a reduction in clearance. If not accounted for, this can induce significant errors in HR-based clearance control systems The decay process is linear in log(time). In real time the decay rate drops off exponentially. It is therefore highly desirable to get as much of the initial (fast) decay out of the way before calibrating the system. One solution is to allow the reference tracks to age naturally at high temperature during the drive manufacturing test process before the HR calibration. However, the total test time needed to effect the decay varies based on, among other things, the number of heads in the drive, and may not be sufficient for all media designs. As such, it may not be possible to guarantee a sufficient time at high temperature in the test process to accelerate thermal decay to the desired levels.

In embodiments described below, a carefully calibrated head field is used to artificially accelerate the thermal decay process. The probabilistic nature of thermal fluctuations is such that spontaneous reversal of magnetic grains results in an exponential amplitude decay rate. By using the write transducer 109, this process can be accelerated with an applied magnetic field. The applied magnetic field reduces the energy barrier that must be crossed in order for the magnetization of a given grain to flip, greatly speeding up the rate of decay. This enables a controlled process where the maximum decay-induced error is not a function of test process time or temperature and all interfaces will be subject to about the same maximum error.

Figure 2:
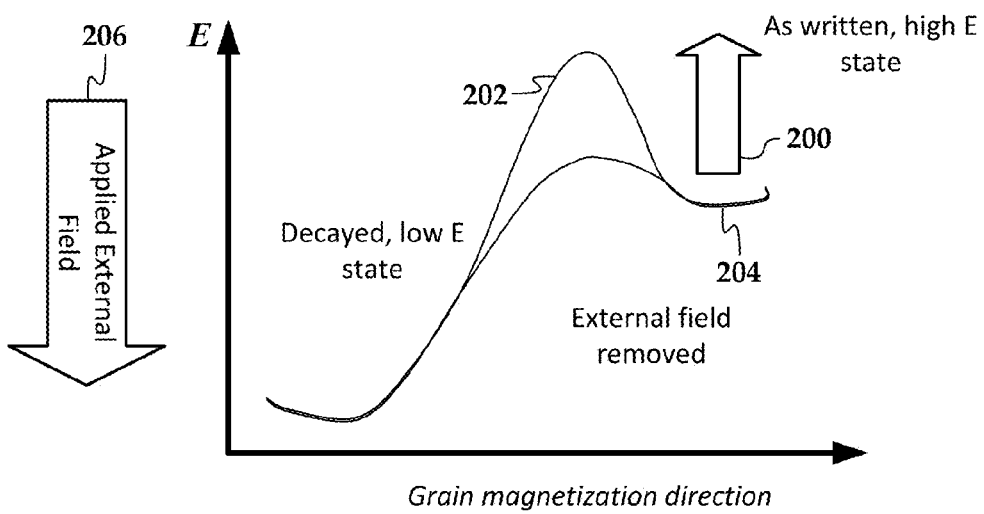
FIG. 2 is a graph illustrating acceleration of thermal decay according to an example embodiment.

In FIG. 2, a graph illustrates how thermal decay can be accelerated according to an example embodiment. After being magnetized in a given direction, most grains within a bit are in their high energy state 200. The least stable (lowest KuV/kt) grains will naturally decay first when thermal fluctuations exceed the energy barrier 202 that keeps them in the local energy well 204. By applying just enough field 206 (e.g., a weak erase field), the natural decay process drops the energy barrier to near zero. Bits of both polarities can be "aged" by applying fields of the ideal magnitude in both directions. Because the applied fields are just strong enough to overcome the high energy state barrier, but not the low one, the aging field applied in one direction does not undo that applied in the other.

The weak magnetic fields described above can provide additional benefits besides the acceleration of thermal decay. For example, current implementations may utilize large guard bands that separate HR reference tracks from user data tracks. This is because writing to the user data tracks can cause side-track erasure (STE) and adjacent track interference (ATI) that can affect the reference tracks similarly to thermal decay, e.g., spontaneously changing the LF/HF ratio of the reference tracks. The guard bands reduce format efficiency, because these are regions on the media surface that cannot be used for data storage.

Adjacent writes and flux-leakage-induced erasure that result in ATI and STE should behave just like accelerated thermal decay. Therefore, the use of low-strength magnetic erase fields should accelerate STE/ATI effects. As such, the guard bands needed to protect the reference tracks can be reduced, increasing the format efficiency of the recording medium.

Figure 3:
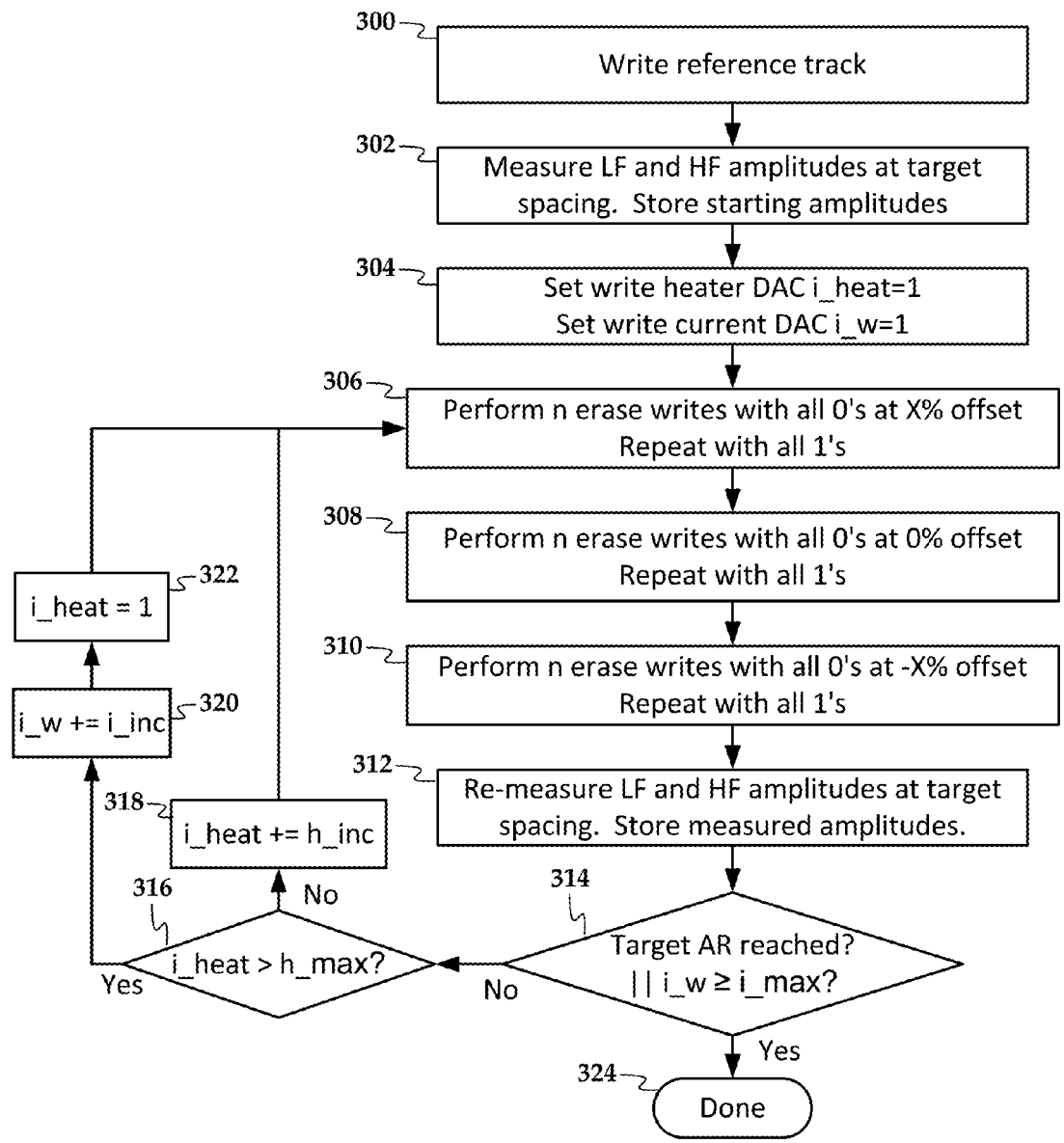
FIG. 3 is a flowchart of a procedure according to an example embodiment.

In FIG. 3, a flowchart illustrates a procedure according to an example embodiment. The procedure involves writing 300 at least one reference track. The reference track includes a signal (e.g., pure tones, mixed tones) that will produce at least LF and HF harmonics when read back by a read/write head. The amplitudes of the LF and HF harmonics are measured 302 by a read/write head at a target head-to-media clearance, and the measured values are stored. Currents for the write heater (i_heat, which controls head-to-media clearance of the writer) and the write coil (i_w, which controls magnetic flux applied to the recording medium via a write pole) are initialized 304 to a lowest value, here the value '1' which is input to respective digital-to-analog converters (DACs) for the heater and write channel.

At operations 306, 308, and 310, a plurality of passes by the read/write head apply a DC erase field in both directions and at different offsets from track center. In this example, applying the DC erase field involves writing all zeros and then all ones (or vice versa). In other embodiments, an AC erase may work to perform these operations instead of or in addition to a DC erase. In one embodiment, X % is set to 25% of track pitch (e.g., nominal center-to-center spacing between tracks), but other offsets could also be used. The HF and LF amplitudes are then re-measured 312, and may optionally be stored.

The amplitude measurements made at operation 312 are compared 314 to the initial amplitude measurements made at operation 302 to determine an amplitude ratio (AR). The AR is the ratio of LF amplitude to HF amplitude, but the LF amplitude could also be used by itself instead of or in addition to the AR. For some embodiments, a target AR change of 7-10% may be used, although other values may be used depending on the type of media, recording technology used, etc. Other measurements may also be used, e.g., the slope of a series of AR or LF measurements, etc., and these may not necessarily depend on a difference between the current measurements and the initial measurement.

The decision at block 314 tests whether the write current is greater than or equal to some maximum. If either the target AR is not reached (or other response criterion is met) or write current is less than the maximum, the procedure continues by incrementing one or both of the heater or writer currents and making more passes with an erase field. Otherwise, if the write current is at or above the maximum, the procedure terminates 324, stopping further application of the erase field so as not to erase the reference track.

The additional passes begin at block 316, where the heater current is tested to see if it is greater than a maximum value. If so, then the clearance is at a minimum value, and so the write current is incremented 320 and the heater current set 322 to the lowest value. Otherwise, if the minimum clearance has not been met, then the heater current is incremented 318. In this way, a magnetic erase field is applied to the reference track in incrementally larger amounts by changing one or both of clearance and field strength until a target thermal decay acceleration has been met (e.g., as a function of AR), or when a maximum write current has been met. In the latter case, erasure of the reference track is prevented by terminating the procedure, even if the target AR has not been met.

It will be understood that variations on the method shown in FIG. 3 are possible. For example, only one of heater current and writer current may be varied during the method. In other embodiments, both heater current and writer current may be incremented at the same time instead of first iterating through different clearance values at a fixed write current. In other variations, only the 0% offset (or some other fixed offset) may be written instead of 0% and ±X %. In yet other variations, more than three offsets may be used.

Figures 4, 5:
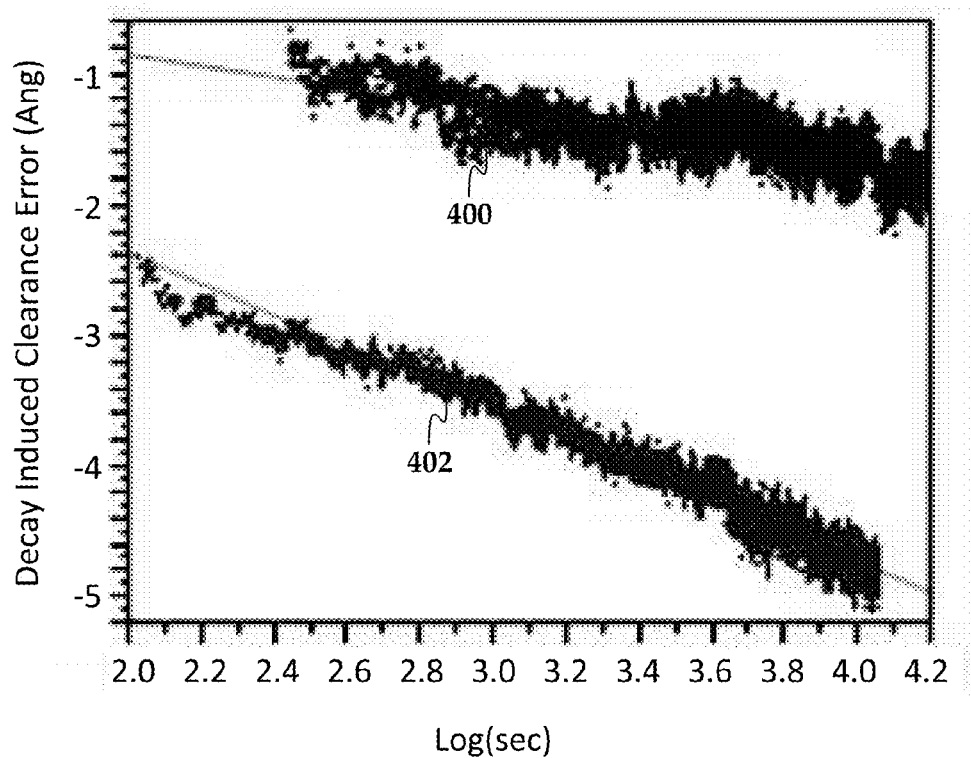
FIG. 4 is a graph showing results of accelerated-aging of a reference track according to an example embodiment.
FIG. 5 is a table showing extrapolated results of the graph in FIG. 4.

In FIG. 4, a graph shows the effects of the gradual application of magnetic fields to a reference track according to an example embodiment. These results are for the same head and track with (plot 400) and without the thermal decay acceleration (plot 402) using DC erase in both directions. The y-axis is decay-induced clearance error in Angstroms. The measurements were of high-frequency (2T) and low-frequency (8T) over time at 65 C. The natural log of their ratio (which is linear in spacing) is converted to angstrom through a known transfer function. The time zero value of clearance is subtracted off and the result is plotted against log time. This gives the effective, decay-induced, clearance error. By accelerating the thermal decay with external fields, decay rate and the overall clearance error is reduced by 65%.

Figure 6:
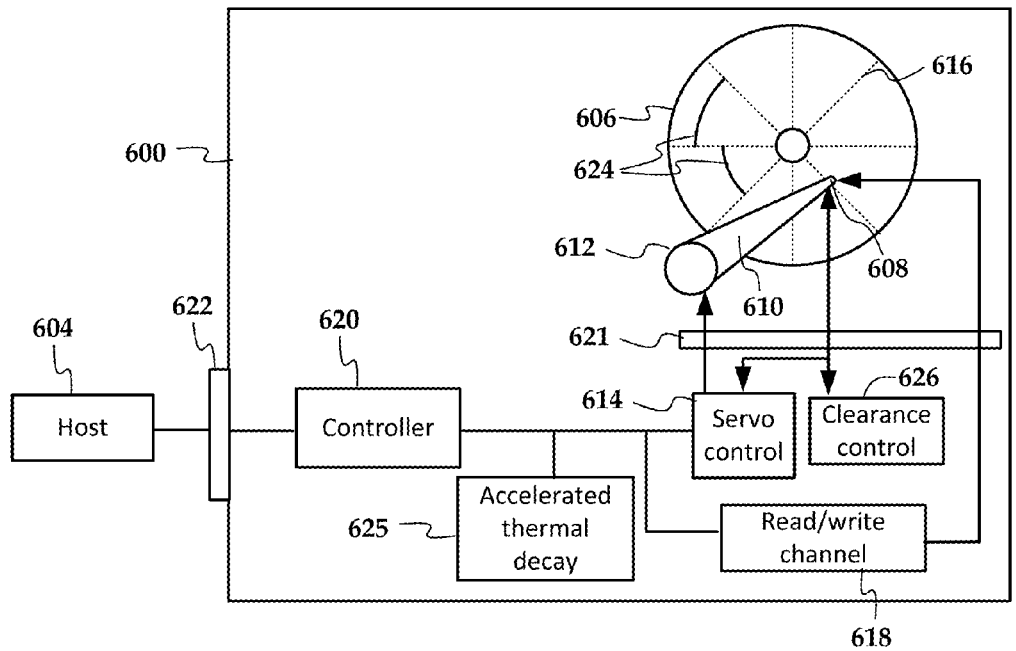
FIG. 6 is a block diagram of an apparatus according to an example embodiment.

In FIG. 6, a table extrapolates these results based on a linear fit of the data in FIG. 5. By using the erase field for thermal-decay acceleration, at least 24-hours of accelerated decay can be ensured before clearance calibration. As indicated in the table, without DC erase acceleration, the total post-calibration error is 3 Å. With acceleration, that error drops to 1 Å.

In examples described above, thermal decay was accelerated by the application of a DC erase field in both directions. However, other patterns may work as well. A DC erase can be fairly straightforward to implement, but it may be difficult to find the required amount of field to performing the aging without causing too much erasure. Some modern preamplifiers have high resolution DAC, and so write current resolution can be high enough to ensure the required amount of field is found. It has also been found that multiple passes of (1T) AC erase will perform thermal-decay acceleration. An AC erase field has a reduced magnetic field. This allows for higher write currents and finer resolution on field changes from one write current to the next.

Figure 8:
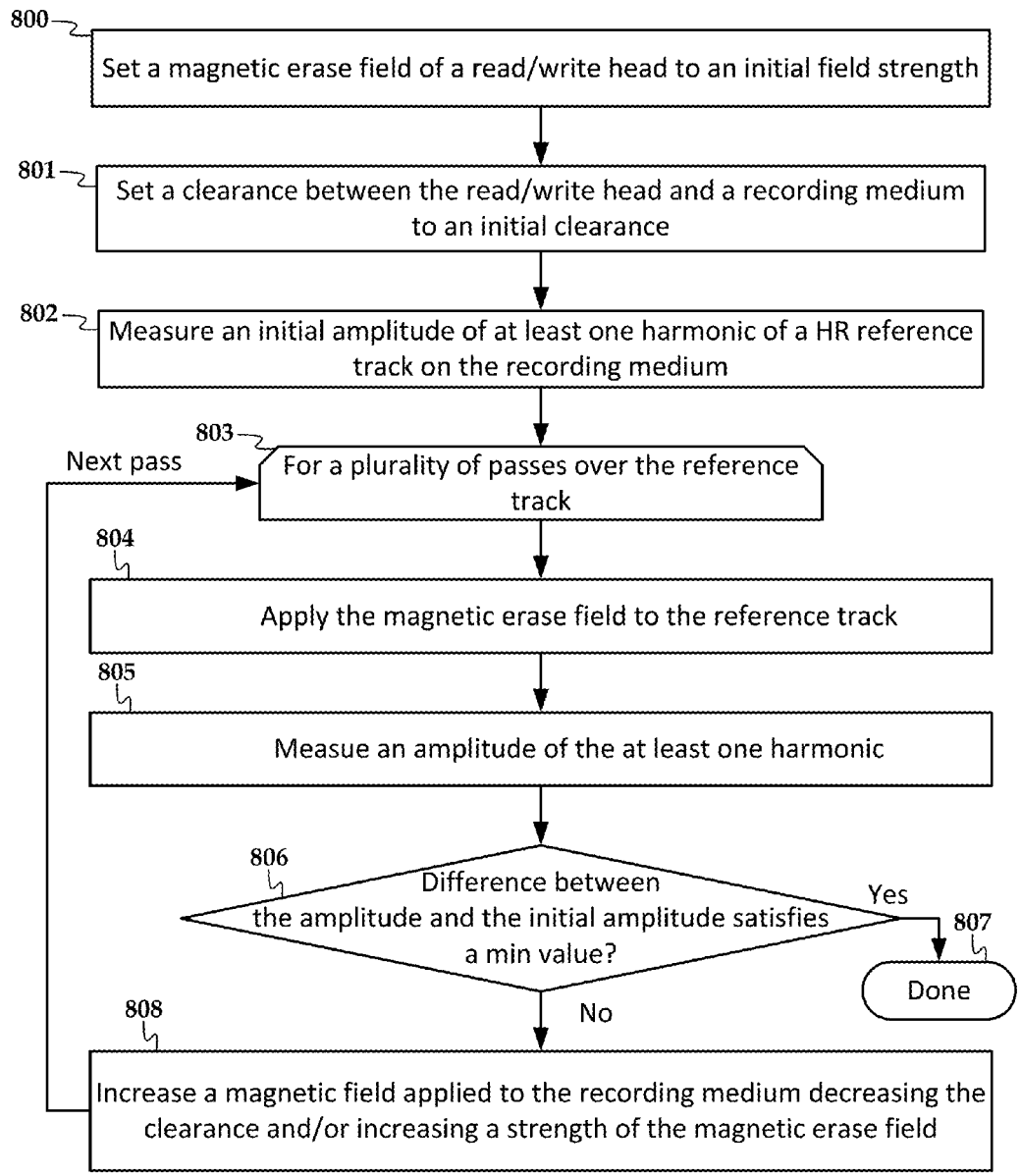

Reference tracks as described above can be used for measuring clearances of read/write heads in hard disk drive apparatuses. The measurement of clearance using these test patterns may be part of initial device calibration, and may also be used in active fly height control for such devices. The block diagram in FIG. 8 shows a disk drive apparatus according to an example embodiment. The hard drive 600 includes one or more magnetic disks 606 used as a recording medium. One or more read/write heads 608 are mounted to one or more arms 610 that are driven together radially via a voice coil motor 612 and optionally via a microactuator (not shown) that can drive each read/write head 608 independently. There may be one read/write head 608 dedicated to each surface of the disks 606. A servo controller 614 reads servo marks 616 on the disk 606 via the read/write heads 608. The servo marks 616 facilitate locating where (e.g., which track and sector) the read/write heads 608 are located.

A read/write channel 618 at least encodes and decodes data written to the disks 616, and may provide other functions, e.g., error correction, timing adjustment, analog-to-digital conversion, digital-to-analog conversion, etc. Interface circuitry 621 facilitates communications between the read/write channel 618 and the read/write heads 608. Such circuitry 621 may include, but is not limited to preamplifiers, amplifiers, filters, etc.

System controller 620 provides system-level control of operations of the hard drive device 600, including servo control and processing data streams via the read/write channel 618. The controller 620 may facilitate operations of other components not shown, such as sub-processors, read/write channels 618, disk motor control, power distribution, etc. The hard drive apparatus 600 includes a host interface 622 for communicating with external devices, as represented by host 604. The host 604 makes request for data storage and retrieval via the host interface 622, the requests being processed via the controller 620.

Reference tracks 624 may be written to the disk via an external device (e.g., a multi-disk writer) and/or via the read/write heads 608. In this example, the reference tracks 624 extend between servo marks 616, although test may be shorter or longer in other embodiments. The reference tracks 624 include patterns with a high-frequency harmonic and a low-frequency harmonic. A ratio between the harmonics can be used to measure a clearance between the read/write heads 608 and the disk 606.

An accelerated thermal decay module 625 operates to apply a magnetic field via the read/write heads 608 to the reference tracks 624 shortly after the tracks are written. The magnetic field is sufficient to accelerate thermal decay (e.g., causing magnetically unstable grains to assume a more stable magnetic orientation) without erasing data from the reference tracks 624. The polarity of the field can be reversed during multiple passes of the read/write heads 608. During the multiple passes, and combination of head-to-media clearance and write coil power can be adjusted to slowly approach a desired state of accelerated decay. The module 625 may be provided within firmware of the hard drive 600 and/or may be temporarily loaded into memory, e.g., via a testing fixture that utilizes the host interface 622 or other electrical interface. The module 625 may also or instead execute in an external device (e.g., host 604) and perform the accelerated aging operations via an input/output interface (not shown) on the hard drive 600.

A clearance control module 626 is operable (e.g., via system controller 620) to read the reference tracks 624 and measure the harmonics, e.g., by transforming sampled data from a time domain to a frequency domain. Amplitude differences between the harmonics and subharmonics can be used to determine a head-to-disk clearance using the Wallace spacing equation as noted above. The measurement of head-to-disk clearance may be used for initial and/or subsequent fly-height calibration, e.g., setting values used in open-loop control of the clearance.

Figure 7:
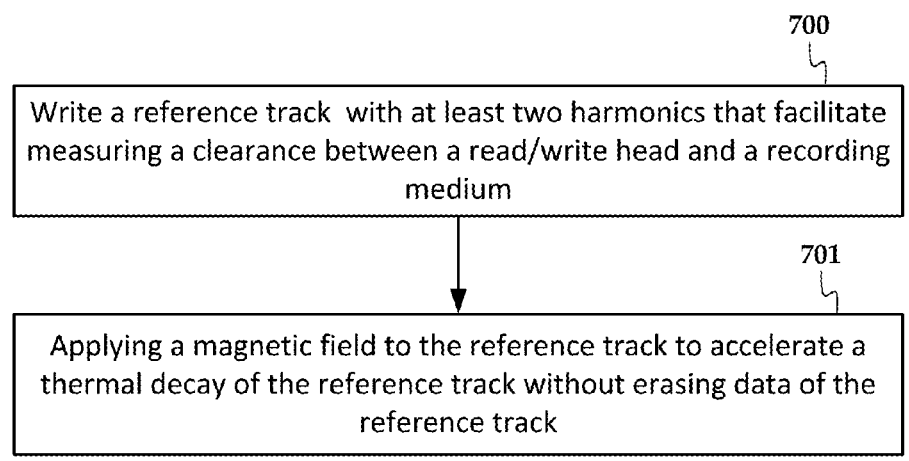
FIGS. 7 and 8 are flowcharts methods according to example embodiments.

In FIG. 7, a flowchart shows a method according to an example embodiment. The method involves writing 700 a reference track to a magnetic recording medium. The reference track includes at least two harmonics that facilitate measuring a clearance between a read/write head and the recording medium. A magnetic field is applied 701 to the reference track. The magnetic field accelerates a thermal decay of the reference track without erasing data of the reference track.

In FIG. 8, a flowchart shows a method according to another example embodiment. The method involves setting 800 a magnetic erase field of a read/write head to an initial field strength. A clearance between the read/write head and a recording medium to is also set 801 an initial clearance. The initial field strength is insufficiently strong to erase data from the recording medium. An initial amplitude of at least one harmonic of a reference track on the recording medium is measured 802. The reference track includes at least two harmonics that facilitate measuring a clearance between the read/write head and the recording medium.

Loop limit 803 indicates the performance of a plurality of passes over the reference track via the read/write head. For each pass, the magnetic erase field is applied 804 to the reference track and an amplitude of the at least one harmonic is measured 805. If a difference between the amplitude and the initial amplitude satisfies a minimum value (block 806), the passes are terminated 807. Otherwise, a magnetic field applied to the recording medium during a subsequent pass is increased 808 by performing at least one of decreasing the clearance and increasing a strength of the magnetic erase field.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    writing a reference track to a magnetic recording medium, the reference track comprising at least two harmonics that facilitate measuring a clearance between a read/write head and the recording medium; and
    applying a magnetic field to the reference track, the magnetic field accelerating a thermal decay of the reference track without erasing data of the reference track.

2. The method of claim 1, wherein the magnetic field comprises a DC erase field.

3. The method of claim 2, wherein applying the magnetic field comprises applying the DC erase field in two directions during two or more passes over the reference track by the read/write head.

4. The method of claim 1, wherein the magnetic field comprises an AC erase field.

5. The method of claim 1, further comprising measuring an initial amplitude of at least one of the harmonics before applying the magnetic erase field, and wherein applying the magnetic erase field comprises, for each of a plurality of passes:
    decreasing the clearance before applying the magnetic erase field;
    reading an amplitude of the at least one harmonic after applying the magnetic erase field at the decreased clearance; and
    stopping further application of the magnetic erase field if a comparison between the amplitude and the initial amplitude satisfies a threshold.

6. The method of claim 5, wherein, if the decreased clearance satisfies a clearance threshold:
    setting the clearance to an initial value and increasing a magnitude of the magnetic erase field; and
    continuing the plurality of passes starting with the initial clearance and the increased magnitude magnetic erase field.

7. The method of claim 5, wherein, for each of the passes, the magnetic field is applied at two or more crosstrack offsets.

8. The method of claim 1, further comprising, after applying the magnetic field to the reference track, using the reference track to measure the clearance between the read/write head and the recording medium.

9. An apparatus, comprising:
    a read/write channel configured to communicate with a read/write head that reads from and writes to a magnetic recording medium, the magnetic recording medium comprising a reference track with at least two harmonics that facilitate measuring a clearance between a read/write head and the recording medium; and
    a controller coupled to the read/write channel and configured to apply a magnetic field to the reference track, the magnetic field accelerating a thermal decay of the reference track without erasing data of the reference track.

10. The apparatus of claim 9, wherein the magnetic field comprises a DC erase field.

11. The apparatus of claim 10, wherein applying the magnetic field comprises applying the DC erase field in two directions during two or more passes over the reference track by the read/write head.

12. The apparatus of claim 9, wherein the magnetic field comprises an AC erase field.

13. The apparatus of claim 9, wherein the controller is further configured to measure an initial amplitude of at least one of the harmonics before applying the magnetic erase field, and wherein applying the magnetic erase field comprises, for each of a plurality of passes:
    decreasing the clearance before applying the magnetic erase field;
    reading an amplitude of the at least one harmonic after applying the magnetic erase field at the decreased clearance; and
    stopping further application of the magnetic erase field if a comparison between the amplitude and the initial amplitude satisfies a threshold.

14. The apparatus of claim 13, wherein, if the decreased clearance satisfies a clearance threshold:
    setting the clearance to an initial value and increasing a magnitude of the magnetic erase field; and
    continuing the plurality of passes starting with the initial clearance and the increased magnitude magnetic erase field.

15. The apparatus of claim 13, wherein, for each of the passes, the magnetic field is applied at two or more cross-track offsets.

16. The apparatus of claim 9, further comprising, after applying the magnetic field to the reference track, using the reference track to measure the clearance between the read/write head and the recording medium.

17. A method comprising:
    setting a magnetic erase field of a read/write head to an initial field strength and a clearance between the read/write head and a recording medium to an initial clearance, the initial field strength being insufficiently strong to erase data from the recording medium;
    measuring an initial amplitude of at least one harmonic of a reference track on the recording medium, the reference track comprising at least two harmonics that facilitate measuring a clearance between the read/write head and the recording medium; and
    for a plurality of passes over the reference track via the read/write head:
        applying the magnetic erase field to the reference track;
        measuring an amplitude of the at least one harmonic after applying the magnetic field; and
        if a difference between the amplitude and the initial amplitude satisfies a minimum value, terminating the passes, otherwise increasing a magnetic field applied to the recording medium during a subsequent pass by performing at least one of decreasing the clearance and increasing a strength of the magnetic erase field.

18. The method of claim 17, further comprising for the plurality of passes, terminating the passes if the strength of the magnetic erase field reaches a maximum value.

19. The method of claim 17, wherein, increasing the erase field applied to the recording medium during each of the passes comprises decreasing the clearance until the clearance is at a minimum clearance, and if the clearance is at the minimum clearance, setting the clearance to the initial clearance increasing the strength of the magnetic erase field.

20. The method of claim 17, wherein, for each of the passes, the magnetic erase field is applied at two or more crosstrack offsets.

\* \* \* \* \*